(12) United States Patent
Melkote Krishnaprasad et al.

(10) Patent No.: US 10,776,992 B2
(45) Date of Patent: Sep. 15, 2020

(54) ASYNCHRONOUS TIME WARP WITH DEPTH DATA

(71) Applicant: QUALCOMM Incorporated, San Diego, CA (US)

(72) Inventors: Vinay Melkote Krishnaprasad, Bangalore (IN); Sudipto Banerjee, Kolkata (IN); Pawan Kumar Baheti, Bangalore (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 15/641,996

(22) Filed: Jul. 5, 2017

(65) Prior Publication Data

US 2019/0012826 A1    Jan. 10, 2019

(51) Int. Cl.
| | |
|---|---|
| *G06T 15/40* | (2011.01) |
| *G06T 15/20* | (2011.01) |
| *G06F 3/01* | (2006.01) |
| *G06T 7/50* | (2017.01) |
| *G06T 17/20* | (2006.01) |
| *G06F 1/16* | (2006.01) |
| *G06T 3/00* | (2006.01) |

(52) U.S. Cl.
CPC ............ *G06T 15/205* (2013.01); *G06F 1/163* (2013.01); *G06F 3/011* (2013.01); *G06F 3/012* (2013.01); *G06F 3/013* (2013.01); *G06T 3/0093* (2013.01); *G06T 7/50* (2017.01); *G06T 17/20* (2013.01)

(58) Field of Classification Search
None
See application file for complete search history.

(56) References Cited

U.S. PATENT DOCUMENTS

| | | | | |
|---|---|---|---|---|
| 6,473,529 | B1 * | 10/2002 | Lin | G06F 7/544 382/232 |
| 9,240,069 | B1 * | 1/2016 | Li | G06T 15/00 |
| 9,721,393 | B1 * | 8/2017 | Dunn | G06T 19/006 |
| 2004/0073544 | A1 * | 4/2004 | Kim | G06K 9/4652 |
| 2004/0109004 | A1 * | 6/2004 | Bastos | G06T 15/04 345/587 |

(Continued)

OTHER PUBLICATIONS

"Asynchronous TimeWarp", Oculus VR, LLC, Accessed date May 10, 2017, 8 pp.

(Continued)

*Primary Examiner* — Anh-Tuan V Nguyen
(74) *Attorney, Agent, or Firm* — Shumaker & Sieffert, P.A.

(57) ABSTRACT

A wearable display device is described that is connected to a host device. The wearable display device includes one or more sensors configured to generate eye pose data indicating a user's field of view, one or more displays, and one or more processors. The one or more processors are configured to output a representation of the eye pose data to the host device and extract one or more depth values for a rendered frame from depth data output by the host device. The rendered frame is generated using the eye pose data. The one or more processors are further configured to modify one or more pixel values of the rendered frame using the one or more depth values to generate a warped rendered frame and output, for display at the one or more displays, the warped rendered frame.

26 Claims, 8 Drawing Sheets

(56) References Cited

U.S. PATENT DOCUMENTS

| | | | |
|---|---|---|---|
| 2005/0244071 A1* | 11/2005 | Zaharia | G06T 9/007 382/251 |
| 2005/0286759 A1* | 12/2005 | Zitnick, III | G06T 15/205 382/154 |
| 2010/0045800 A1* | 2/2010 | Chebil | G03B 13/36 348/169 |
| 2010/0091861 A1* | 4/2010 | Sung | H04N 19/105 375/240.16 |
| 2010/0194856 A1* | 8/2010 | Varekamp | G06T 5/005 348/42 |
| 2010/0215251 A1* | 8/2010 | Klein Gunnewiek | H04N 19/597 382/154 |
| 2010/0259595 A1* | 10/2010 | Trimeche | H04N 13/117 348/43 |
| 2011/0032341 A1* | 2/2011 | Ignatov | H04N 13/144 348/51 |
| 2011/0050693 A1* | 3/2011 | Lauritzen | G06T 15/60 345/426 |
| 2011/0058021 A1* | 3/2011 | Chen | G06T 15/205 348/46 |
| 2011/0134114 A1* | 6/2011 | Rais | G06T 7/521 345/419 |
| 2011/0200230 A1* | 8/2011 | Luke | G06K 9/00791 382/103 |
| 2012/0008672 A1* | 1/2012 | Gaddy | G06T 1/0028 375/240.01 |
| 2012/0162200 A1* | 6/2012 | Mishima | H04N 13/128 345/419 |
| 2012/0274747 A1* | 11/2012 | Yasuda | H04N 13/0022 348/51 |
| 2013/0101175 A1* | 4/2013 | Lynch | G01C 3/00 382/106 |
| 2013/0242047 A1* | 9/2013 | Noguchi | G06T 7/50 348/43 |
| 2013/0266208 A1* | 10/2013 | Lim | G06T 5/005 382/154 |
| 2014/0002439 A1* | 1/2014 | Lynch | G09B 29/007 345/419 |
| 2014/0118494 A1* | 5/2014 | Wu | G06T 7/20 348/44 |
| 2014/0192154 A1* | 7/2014 | Jeong | H04N 19/597 348/43 |
| 2014/0285626 A1* | 9/2014 | Fu | H04N 19/597 348/46 |
| 2014/0313191 A1* | 10/2014 | Bruls | H04N 13/128 345/419 |
| 2014/0333739 A1* | 11/2014 | Yang | G06K 9/4642 348/54 |
| 2014/0348242 A1* | 11/2014 | Ohtsu | H04N 19/597 375/240.16 |
| 2015/0015569 A1* | 1/2015 | Jung | G06T 15/005 345/419 |
| 2015/0049937 A1* | 2/2015 | Choi | G06K 9/6267 382/154 |
| 2015/0085073 A1* | 3/2015 | Bruls | H04N 13/144 348/43 |
| 2015/0195573 A1* | 7/2015 | Aflaki Beni | H04N 19/513 375/240.16 |
| 2015/0206312 A1* | 7/2015 | Luo | G06T 7/194 382/173 |
| 2015/0269736 A1* | 9/2015 | Hannuksela | H04N 13/161 345/419 |
| 2016/0063714 A1* | 3/2016 | Middleton | G06T 7/11 382/195 |
| 2016/0134874 A1* | 5/2016 | Konieczny | H04N 19/597 375/240.08 |
| 2016/0150235 A1* | 5/2016 | Schulze | H04N 19/132 375/240.02 |
| 2016/0335795 A1 | 11/2016 | Flynn et al. | |
| 2017/0018121 A1 | 1/2017 | Lawson et al. | |
| 2017/0126968 A1 | 5/2017 | Somanath et al. | |
| 2017/0150115 A1* | 5/2017 | Vandewalle | H04N 13/398 |
| 2017/0251194 A1* | 8/2017 | Plank | G06T 7/11 |
| 2017/0302903 A1* | 10/2017 | Ng | G06T 15/205 |
| 2017/0332096 A1* | 11/2017 | Singh | H04N 19/176 |
| 2017/0345220 A1* | 11/2017 | Bates | G06T 19/20 |
| 2018/0012078 A1* | 1/2018 | Pournaghi | G06K 9/00718 |
| 2018/0096519 A1* | 4/2018 | Tokubo | G06F 1/1626 |
| 2018/0184013 A1* | 6/2018 | Hamano | G06T 7/593 |
| 2018/0204340 A1* | 7/2018 | Zhao | H04N 13/106 |
| 2018/0241927 A1* | 8/2018 | Chen | H04N 5/2351 |
| 2018/0322644 A1* | 11/2018 | Sunkavalli | G06T 7/49 |
| 2018/0322689 A1* | 11/2018 | Bista | G06T 7/579 |
| 2019/0139197 A1* | 5/2019 | Myokan | G06T 1/00 |

OTHER PUBLICATIONS

Van Waveren, "The Asynchronous Time Warp for Virtual Reality on Consumer Hardware", CM Conference on Virtual Reality Software and Technology, Nov. 2-4, 2016, 10 pp.

Mark et al., "Post-rendering 3D Warping," In Proceedings of 1997 Symposium on Interactive 3D Graphics, Providence, RI, Apr. 27-30, 1997, Department of Computer Science, University of North Carolina at Chapel Hill, 10 pp.

Gast, M., "802.11® Wireless Networks: The Definitive Guide," O'Reilly, Apr. 2002, 436 pp.

Rolland et al., "Head-Mounted Display Systems," Encyclopedia of Optical Engineering, Mar. 2005, 14 pp.

\* cited by examiner

ASYNCHRONOUS TIME WARP WITH DEPTH DATA

TECHNICAL FIELD

The disclosure relates to processing of image content information and, more particularly, post-processing of image content information for output to a display.

BACKGROUND

Split-rendered systems may include at least one host device and at least one client device that communicate over a network (e.g., a wireless network, wired network, etc.). For example, a Wi-Fi Direct (WFD) system includes multiple devices communicating over a Wi-Fi network. The host device acts as a wireless access point and sends image content information, which may include audio video (AV) data, audio data, and/or video data, to one or more client devices participating in a particular peer-to-peer (P2P) group communication session using one or more wireless communication standards, e.g., IEEE 802.11. The image content information may be played back at both a display of the host device and displays at each of the client devices. More specifically, each of the participating client devices processes the received image content information for presentation on its display screen and audio equipment. In addition, the host device may perform at least some processing of the image content information for presentation on the client devices.

The host device and one or more of the client devices may be either wireless devices or wired devices with wireless communication capabilities. In one example, as wired devices, one or more of the host device and the client devices may comprise televisions, monitors, projectors, set-top boxes, DVD or Blu-Ray Disc players, digital video recorders, laptop or desktop personal computers, video game consoles, and the like, that include wireless communication capabilities. In another example, as wireless devices, one or more of the host device and the client devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices (WCDs).

In some examples, at least one of the client devices may comprise a wearable display device. A wearable display device may comprise any type of wired or wireless display device that is worn on a user's body. As an example, the wearable display device may comprise a wireless head-worn display or wireless head-mounted display (WHMD) that is worn on a user's head in order to position one or more display screens in front of the user's eyes. The host device is typically responsible for performing at least some processing of the image content information for display on the wearable display device. The wearable display device is typically responsible for preparing the image content information for display at the wearable display device.

SUMMARY

In general, this disclosure relates to techniques for correcting for camera translation (e.g., moving the wearable display device towards or away from a virtual object) while a host device generates image content information and transmits the image content information to a wearable display device. A host device may have per-pixel depth data that may be used to correct for camera translation. However, in split-rendered systems (e.g., where both the host device and the wearable display device process image data such as in gaming virtual reality (VR), augmented reality (AR) applications, etc.), transmitting per-pixel depth data from the host device to the wearable display device, which is an example of a client device, may consume significant bandwidth.

The techniques of this disclosure are directed to systems that permit time and space warping to correct for a translation of head position and scene motion from their state in the last fully rendered frame without necessarily always transmitting/receiving per-pixel depth data. For example, a host device of a split-rendered system may generate quantized depth data for each depth layer of a scene and may generate masks indicating which pixels are in which layer of the scene. In another example, the host device may assign a single depth value for all pixels of a scene.

In one example, this disclosure is directed to a wearable display device connected to a host device. The wearable display device including one or more sensors configured to generate eye pose data indicating a user's field of view, one or more displays, and one or more processors implemented in circuitry. The one or more processors are configured to output a representation of the eye pose data to the host device and extract one or more depth values for a rendered frame from depth data output by the host device. Each one of the one or more depth values indicates a weighted depth value for a plurality of pixels of the rendered frame. The rendered frame is generated using the eye pose data. The one or more processors are further configured to modify one or more pixel values of the rendered frame using the one or more depth values to generate a warped rendered frame and output, for display at the one or more displays, the warped rendered frame.

In another example, this disclosure is directed to a method including outputting, by a processor implemented in circuitry, a representation of eye pose data indicating a user's field of view to a host device and extracting, by the processor, one or more depth values for a rendered frame from depth data output by the host device. Each one of the one or more depth values indicates a weighted depth value for a plurality of pixels of the rendered frame. The rendered frame is generated using the eye pose data. The method further includes modifying, by the processor, one or more pixel values of the rendered frame using the one or more depth values to generate a warped rendered frame and outputting, by the processor, for display at one or more displays, the warped rendered frame.

In a further example, this disclosure is directed to a non-transitory computer-readable storage medium having stored thereon instructions that, when executed, cause a processor of a wearable display device to output a representation of eye pose data indicating a user's field of view to a host device and extract one or more depth values for a rendered frame from depth data output by the host device. Each one of the one or more depth values indicates a weighted depth value for a plurality of pixels of the rendered frame. The rendered frame is generated using the eye pose data. The instructions further cause the processor to modify one or more pixel values of the rendered frame using the one or more depth values to generate a warped rendered frame and output, for display at one or more displays of the wearable display device, the warped rendered frame.

In one example, this disclosure is directed to a wearable display device connected to a host device. The wearable display device including means for outputting a representation of eye pose data indicating a user's field of view to a host device and means for extracting one or more depth values for a rendered frame from depth data output by the host device. Each one of the one or more depth values indicates a weighted depth value for a plurality of pixels of the rendered frame. The rendered frame is generated using the eye pose data. The wearable display device further includes means for modifying one or more pixel values of the rendered frame using the one or more depth values to generate a warped rendered frame and means for outputting for display at one or more displays, the warped rendered frame.

In another example, this disclosure is directed to a host device connected to a wearable display device, the host device comprising one or more processors implemented in circuitry that are configured to generate image content information for a rendered frame based on eye pose data received from the wearable display device and generate one or more depth values using per-pixel depth data for the rendered frame. Each one of the one or more depth values indicating a weighted depth value for a plurality of pixels of the rendered frame. The one or more processors being further configured to send, to the wearable display device, the image content information for the rendered frame and depth data indicating the one or more depth values.

In another example, this disclosure is directed to a method including generating, by one or more processors implemented in circuitry, image content information for a rendered frame based on eye pose data received from the wearable display device and generating, by the one or more processors, one or more depth values using per-pixel depth data for the rendered frame. Each one of the one or more depth values indicating a weighted depth value for a plurality of pixels of the rendered frame. The method further including sending, by the one or more processors, to the wearable display device, the image content information for the rendered frame and depth data indicating the one or more depth values.

In a further example, this disclosure is directed to a non-transitory computer-readable storage medium having stored thereon instructions that, when executed, cause a processor of a host device connected to a wearable display device to generate image content information for a rendered frame based on eye pose data received from the wearable display device and generate one or more depth values using per-pixel depth data for the rendered frame. Each one of the one or more depth values indicating a weighted depth value for a plurality of pixels of the rendered frame. The instructions further cause the processor to send, to the wearable display device, the image content information for the rendered frame and depth data indicating the one or more depth values.

In another example, this disclosure is directed to a host device connected to a wearable display device, the host device including means for generating image content information for a rendered frame based on eye pose data received from the wearable display device and means for generating one or more depth values using per-pixel depth data for the rendered frame. Each one of the one or more depth values indicating a weighted depth value for a plurality of pixels of the rendered frame. The host device further includes means for sending to the wearable display device, the image content information for the rendered frame and depth data indicating the one or more depth values.

The details of one or more examples of the disclosure are set forth in the accompanying drawings and the description below. Other features, objects, and advantages will be apparent from the description, drawings, and claims.

DETAILED DESCRIPTION

Figure 1:
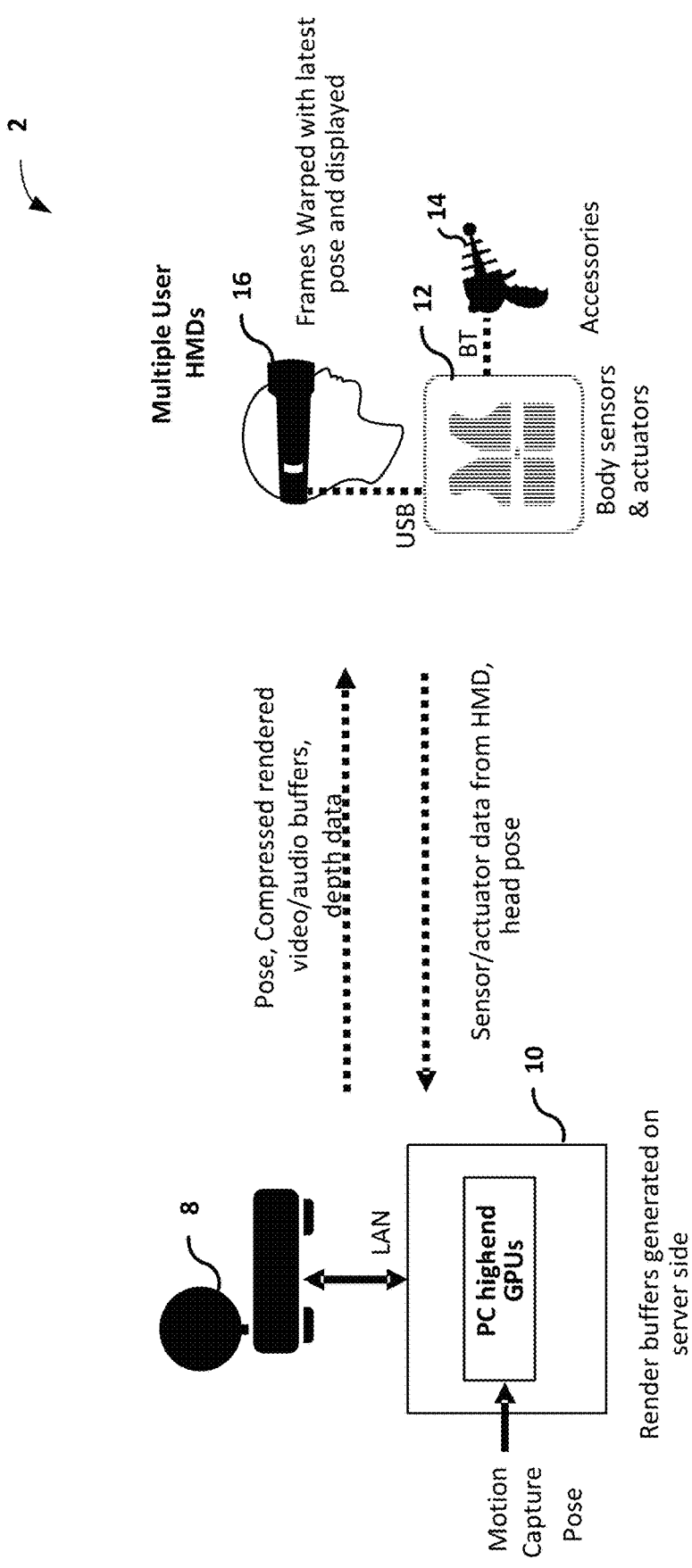
FIG. 1 is a block diagram illustrating a split-rendered system including a host device and a wearable display device.

Imaging systems may generate a 360-degree image (e.g., canvas) for displaying video. For example, an imaging system may output a portion of the canvas that is in a user's field of view at a virtual reality (VR) headset.

Some imaging systems may be split-rendered. An example split-rendered system may include a host device (e.g., computer, cloud, etc.) that generates a compressed rendered video buffer (and a compressed rendered audio buffer) and a client device (e.g., a head-mounted display (HMD)) that decompresses the compressed rendered video buffer (and audio buffer) for display at the client device.

In split-rendered systems, a client device may output an eye pose indicating a user's field of view. The host device may generate compressed rendered video/audio buffers for the eye pose. However, split-rendered systems may have a small process time (e.g., 20 milliseconds) between sending the eye pose and outputting the rendered video/audio buffers. This delay may cause the actual content being rendered to represent an earlier eye pose, rather than the current eye pose. For example, the user may rotate her head slightly while the split-rendered system processes the rendered video. In this case, the content the that user is viewing is from a different, earlier field of view than her current field of view resulting in negative experience.

In order to account for process time in split-rendered systems, which results in delay in the display, client devices may perform time and space warping to correct for evolution of head position and scene motion from their state in the last fully rendered frame. For example, a client device may first fully render a frame based on the received content, where the rendered frame is based on earlier eye pose, and then the client device may perform an Asynchronous Time Warp (ATW) that corrects for a rotation of a user's head.

More specifically, for instance, the client devices may include a graphics processing unit (GPU) that receives image content information from the host device, and the image content information that the device receives may be based on the position of the eye(s) or head of the user of the client device. For an eye buffer round, the GPU of the client device may generate a rendered frame based on the received image content information. However, the position of the user's eye(s) or head may have changed from the time of the request to the present time. Accordingly, in a warping round, the GPU of the client device may warp (e.g., shift, rotate, stretch, or otherwise modify) the image content generated in the eye buffer round to accommodate for any change in the position of the user's eye(s) or head of the client device.

However, ATW techniques may not correct for a movement of a user's field of view toward (or away from) an object in a scene. Such ATW techniques may result in "positional judder," especially for objects of the scene that are near the user in the virtual space. One way for the client device to account for head translation in relation to objects in the scene is by utilizing per-pixel depth data; however, such per-pixel depth data may not be easily accessible by the client device. In the context of split-rendered systems (e.g., gaming VR) such per-pixel depth data is readily available at the host device (e.g., rendering engine). However, in split-rendered systems (e.g., gaming VR), transmitting per-pixel depth data from the host device to the client device may consume significant bandwidth.

The techniques of this disclosure are directed to split-rendered systems that permit time and space warping to correct for translation of head position (e.g., camera translation) and scene motion from their state in the last fully rendered frame without necessarily transmitting/receiving per-pixel depth data. In this way, the example techniques may provide the user with a better viewing experience without substantial increase in the bandwidth.

FIG. 1 is a block diagram illustrating split-rendered system 2 including a host device 10 and wearable display device 16. In the example of FIG. 1, split-rendered system 2 includes host device 10 and only one client device, i.e., wearable display device 16. In other examples, split-rendered system 2 may include additional client devices (not shown), which may comprise wearable display devices, wireless devices or wired devices with wireless communication capabilities.

In some examples, split-rendered system 2 may conform to the Wi-Fi Direct (WFD) standard defined by the Wi-Fi Alliance. The WFD standard enables device-to-device communication over Wi-Fi networks, e.g., wireless local area networks, in which the devices negotiate their roles as either access points or client devices. Split-rendered system 2 may include one or more base stations (not shown) that support a plurality of wireless networks over which a peer-to-peer (P2P) group communication session may be established between host device 10, wearable display device 16, and other participating client devices. A communication service provider or other entity may centrally operate and administer one or more of these wireless networks using a base station as a network hub.

According to the WFD standard, host device 10 may act as a wireless access point and receive a request from wearable display device 16 to establish a P2P group communication session. For example, host device 10 may establish the P2P group communication session between host device 10 and wearable display device 16 using the Real-Time Streaming Protocol (RTSP). The P2P group communication session may be established over a wireless network, such as a Wi-Fi network that uses a wireless communication standard, e.g., IEEE 802.11a, 802.11g, or 802.11n improvements to previous 802.11 standards. Additional information regarding wireless networks may be found in Gast, M., "802.11® Wireless Networks: The Definitive Guide," O'Reilly, April 2002.

Once the P2P group communication session is established, host device 10 may send image content information, which may include audio video (AV) data, audio data, and/or video data, to wearable display device 16, and any other client devices, participating in the particular P2P group communication session. For example, host device 10 may send the image content information to wearable display device 16 using the Real-time Transport protocol (RTP). The image content information may be played back at both a display of host device 10 and display screens of wearable display device 16. It should be understood that display of content at host device 10 is merely one example, and is not necessary in all examples. Wearable display device 16 may process the image content information received from host device 10 for presentation on its display screens and audio equipment. Wearable display device 16 may perform these operations with a computer processing unit and graphics processing unit that are limited by size and weight in order to fit within the structure of a handheld device. In addition, host device 10 may perform at least some processing of the image content information for presentation on wearable display device 16.

A user of wearable display device 16 may provide user input via an interface, such as a human interface device (HID), included within or connected to wearable display device 16. An HID may comprise one or more of a touch display, an input device sensitive to an input object (e.g., a finger, stylus, etc.), a keyboard, a tracking ball, a mouse, a joystick, a remote control, a microphone, or the like. As shown, wearable display device 16 may be connected to one or more body sensors and actuators 12 via universal serial bus (USB), which may be connected to one or more accessories 14 via Bluetooth™.

Wearable display device 16 sends the provided user input to host device 10. In some examples, wearable display device 16 sends the user input over a reverse channel architecture referred to as a user input back channel (UIBC). In this way, host device 10 may respond to the user input provided at wearable display device 16. For example, host device 10 may process the received user input and apply any effect of the user input on subsequent data sent to wearable display device 16.

Host device 10 may be either a wireless device or a wired device with wireless communication capabilities. In one example, as a wired device, host device 10 may comprise one of a television, monitor, projector, set-top box, DVD or Blu-Ray Disc player, digital video recorder, laptop or desktop personal computer, video game console, and the like, that includes wireless communication capabilities. Other examples of host device 10 are possible. For example, host device 10 may be a file server that stores image content, and selectively outputs image content based on user input from display device 16. For instance, host device 10 may store 360-degree video content, and based on user input may output selected portions of the 360-degree video content. Accordingly, host device 10 need not necessarily include high end graphics processing units (GPUs) illustrated in FIG. 1 and described in more detail below in all examples. Host device 10 may be proximate to wearable display device 16 (e.g., in the same room), or host device 10 and wearable display device 16 may be in different locations.

As shown, host device 10 may be connected to a network 8 (e.g., the Internet) via a local area network (LAN). In another example, as a wireless device, host device 10 may comprise one of a mobile telephone, portable computer with a wireless communication card, personal digital assistant (PDA), portable media player, or other flash memory device with wireless communication capabilities, including a so-called "smart" phone and "smart" pad or tablet, or another type of wireless communication device (WCD).

Wearable display device 16 may comprise any type of wired or wireless display device that is worn on a user's body. As an example, wearable display device 16 may comprise a head-worn display or a head-mounted display (HMD) that is worn on a user's head in order to position one or more display screens in front of the user's eyes. In general, the display screens of wearable display device 16 may comprise one of a variety of display screens such as a liquid crystal display (LCD), a plasma display, an organic light emitting diode (OLED) display, or another type of display screen.

In one example, wearable display device 16 may comprise a HMD device formed as glasses that include display screens in one or more of the eye lenses, and also include a nose bridge and temple arms to be worn on a user's face. As another example, wearable display device 16 may comprise a HMD device formed as goggles that includes display screens in separate eye lenses or a single display screen, and that also includes at least one strap to hold the goggles on the user's head. Although wearable display device 16 is primarily described in this disclosure as being a HMD, in other examples wearable display device 16 may comprise display devices that are worn on other portions of the user's body, such as on the user's neck, shoulders, arm or wrist. Specific examples of HMDs and their operation are described in more detail in Rolland, J. & Hua, H., "Head-Mounted Display Systems," Encyclopedia of Optical Engineering, 2005.

In split-rendered system 2, host device 10 and wearable display device 16 are typically wireless devices. For example, wearable display device 16 may comprise a wireless HMD (WHMD) that connects wirelessly to host device 10, and host device 10 may comprise a WCD, such as a mobile smart phone or smart pad. In this example, in addition to typical WCD operations, host device 10 performs at least some image content information processing for presentation on wearable display device 16 and user input processing from user interface interactivity at wearable display device 16.

In the example of FIG. 1, wearable display device 16 outputs sensor and/or actuator data to host device 10. The sensor and/or actuator data may include eye pose data indicating a user's field of view. In response to receiving the sensor and/or actuator data, host device 10 generates image content information for rendering a frame. For example, host device 10 may generate a compressed video and audio buffer using eye pose data indicated by the sensor and/or actuator data. However, as discussed above, a user may have moved the wearable display device 16 such that an eye pose has changed while transmitting the eye pose data, generating the compressed rendered video and audio buffers, and transmitting the compressed rendered video and audio buffers. To account for the change in eye pose, wearable display device 16 performs time and space warping to correct for a rotation of a user's head and to correct for a movement of a user's field of view toward (or away from) an object in a scene.

More specifically, host device 10 may generate depth data to permit wearable display device 16 to correct for movement of a user's field of view toward (or away from) an object in a scene. That is, while generating the compressed rendered video and audio buffers, host device 10 may generate one or more depth values for a rendered frame using per-pixel depth values. Each depth value may represent a depth value for multiple pixel values. In this way, less data may be necessarily transmitted from host device 10 to wearable display device 16 compared to systems that use only per-pixel depth values.

Host device 10 may generate quantized depth data for each depth layer of a scene and may generate masks indicating which pixels are in which layer of the scene. For example, a host device 10 may generate, using per-pixel depth data, quantized depth data and masks. In this example, wearable display device 16 may receive a representation of the depth data and the masks and may perform time and space warping to correct for translation of head position and scene motion using the quantized depth data and the masks.

More specifically, host device 10 may compute, using per-pixel depth data, a histogram of depth for all pixels and divide the histogram into partitions. For example, host device 10 may divide the depth space at a center point at each set of n or more 0 pixel depth space values. In another example, host device 10 may use clustering to partition the histogram into K bins. In any case, wearable display device 16 may receive a representation of the partitions of the histogram. After host device 10 divides the histogram into partitions, host device 10 may assign a depth value for each partition. For example, host device 10 may assign a depth value to a particular partition that corresponds to an average depth of pixels arranged in the particular partition. In this way, host device 10 may generate quantized depth data. Said differently, rather than assigning an absolute per-pixel depth value for each pixel of a rendered frame, host device 10 may quantize the absolute per-pixel depth value for each pixel of a rendered frame by assigning each pixel to a partition having a corresponding depth value.

Host device 10 may generate a weighted depth value for pixels arranged in a particular partition of a rendered frame. For example, host device 10 may apply a first weighting factor to a depth value (e.g., a mean depth value, a median depth value, a minimum depth value, a maximum depth value, a mean foveal depth value, etc.) for a first set of pixels arranged in a particular partition of the rendered frame to generate a first weighted depth value. In this example, host device 10 may apply a second weighting factor to a depth value (e.g., a mean depth value, a median depth value, a minimum depth value, a maximum depth value, a mean foveal depth value, etc.) for a second set of pixels arranged in the particular partition of the rendered frame to generate a second weighted depth value. In this example, the second weighting factor has a different value than the first weighting factor. In this example, host device 10 may generate the weighted depth value for the partition by combining (e.g., averaging, adding, etc.) the first weighted depth value and the second weighted depth value.

Host device 10 may generate a weighted depth value for pixels arranged in a particular partition of a rendered frame that corresponds to a weighted average depth for pixels arranged in the particular partition. For instance, host device 10 may divide a particular partition into a first half and a second half, where the first half includes pixels that are closer to a user in the virtual space than pixels arranged in the second half of the particular partition. In this instance, host device 10 may assign pixels arranged in the first half of the particular partition a weighting factor that is larger (e.g., two times) than a weighting factor assigned to pixels arranged in the second half of the particular partition. In this instance, host device 10 may generate a first weighted depth value for the first half by multiplying an average depth value for the pixels arranged in the first half of the particular partition by the weighting factor for the first half of the particular partition and generate a second weighted depth value for the second half by multiplying an average depth value for the pixels arranged in the second half of the particular partition by the weighting factor for the second half of the particular partition. In this example, host device 10 may generate the weighted depth value for the partition by combining (e.g., averaging, adding, etc.) the first weighted depth value for the first half and the second weighted depth value for the first half.

Host device 10 may generate a weighted depth value for pixels arranged in a particular partition of a rendered frame that corresponds to a minimum depth of pixels arranged in the particular partition. For example, host device 10 may assign pixels arranged in a closest depth value of the particular partition a unity weighting factor and assign other pixels arranged in the particular partition a weighting factor corresponding to zero. In this way, host device 10 may perform warping to favor closer objects within the partition.

Host device 10 may generate a weighted depth value for pixels arranged in a particular partition of a rendered frame that corresponds to a maximum depth of pixels arranged in the particular partition. For example, host device 10 may assign pixels arranged in a furthest depth value of the particular partition a unity weighting factor and assigned other pixels arranged in the particular partition a weighting factor corresponding to zero. In this way, host device 10 may perform warping to favor further objects within the partition.

Host device 10 may generate a weighted depth value for pixels arranged in a particular partition of a rendered frame that corresponds to a mean foveal depth of pixels arranged in the particular partition. For example, host device 10 may assign pixels arranged in each depth value of the particular partition a weighting factor corresponding to a number of pixels in the partition at a respective depth value within the foveal region of the rendered frame.

Host device 10 may generate a mask to indicate the pixels arranged in each partition. For example, host device 10 may generate a mask indicating each pixel for a particular partition. In some examples, host device 10 may send the mask at macroblock granularity. Said differently, host device 10 may generate the mask to include a representation of a macroblock rather than indicating each pixel for a particular partition. In any case, wearable display device 16 may receive a representation of the mask for each partition.

Host device 10 may generate a single depth value for all pixels of a rendered frame. For example, host device 10 may generate a single depth value to all pixels of the rendered frame such that the single depth value corresponds to a median depth of the rendered frame.

Host device 10 may generate a weighted depth value for all pixels of a rendered frame. It should be understood that host device 10 may generate a weighted depth value for all pixels of a rendered frame using a substantially similar process as described above with respect to generating a weighted depth value for pixels arranged in a partition. For example, host device 10 may apply a first weighting factor to a depth value for a first set of pixels arranged in the rendered frame to generate a first weighted depth value. In this example, host device 10 may apply a second weighting factor to a depth value for a second set of pixels arranged in the rendered frame to generate a second weighted depth value. In this example, the second weighting factor has a different value than the first weighting factor. In this example, host device 10 may generate the weighted depth value for the rendered frame by combining (e.g., averaging, adding, etc.) the first weighted depth value for the first half and the second weighted depth value for the first half.

Host device 10 may generate a single depth value to indicate a weighted depth value for a rendered frame that corresponds to a weighted average depth for all pixels of a rendered frame. For instance, host device 10 may divide the rendered frame into a first half and a second half, where the first half includes pixels that are closer to a user in the virtual space than pixels arranged in the second half of the rendered frame. In this instance, host device 10 may assign pixels arranged in the first half of the rendered frame a weighting factor that is larger (e.g., two times) than a weighting factor assigned to pixels arranged in the second half of the rendered frame. In this example, host device 10 may generate a first weighted depth value for the first half of the rendered frame by multiplying an average depth value for the pixels arranged in the first half of the rendered frame by the weighting factor for the first half of the rendered frame and generate a second weighted depth value for the second half of the rendered frame by multiplying an average depth value for the pixels arranged in the second half of the rendered frame by the weighting factor for the second half of the rendered frame. In this example, host device 10 may generate the weighted depth value for the rendered frame by combining (e.g., averaging, adding, etc.) the first weighted depth value for the first half of the rendered frame and the second weighted depth value for the first half of the rendered frame.

Host device 10 may generate a weighted depth value for all pixels of a rendered frame that corresponds to a minimum depth of the rendered frame. For example, host device 10 may assign pixels arranged in a closest depth value of the rendered frame a unity weighting factor and assigned other pixels arranged in the rendered frame a weighting factor corresponding to zero. In this way, host device 10 may perform warping to favor closer objects within the rendered frame.

Host device 10 may generate a weighted depth value for all pixels of a rendered frame that corresponds to a maximum depth of the rendered frame. For example, host device 10 may assign pixels arranged in a furthest depth value of the rendered frame a unity weighting factor and assigned other pixels arranged in the rendered frame a weighting factor corresponding to zero. In this way, host device 10 may perform warping to favor further objects within the rendered frame.

Host device 10 may generate a weighted depth value for all pixels of a rendered frame that corresponds to a mean foveal depth for all pixels of the rendered frame. For example, host device 10 may assign pixels arranged in each depth value of the rendered frame a weighting factor corresponding to a number of pixels in the rendered frame at a respective depth value within the foveal region of the rendered frame.

After generating the single depth value or per-partition depth values, host device 10 may output the single depth value and/or per-partition depth values to wearable display device 16, which may perform, using the single depth value and/or per-partition depth values, time and space warping to correct for translation of head position and scene motion from their state in the last fully rendered frame. In instances using per-partition depth values, host device 10 may send quantized depth for each partition once per slice in a header. In some examples, wearable display device 16 may warp each layer/partition individually and blend the layers together. Such an approach, however, may result in holes. In some other examples, wearable display device 16 may generate a single grid of vertices that spans all partitions. The sub-set of these vertices that lie within the same partition may have the same depth. In this way, rather than warping each partition separately, wearable display device 16 may perform time and space warping once using the single grid to avoid holes in a resulting warped frame.

In this way, wearable display device 16 represents an example wearable display device connected to a host device. The wearable display device comprising one or more sensors configured to generate eye pose data indicating a user's field of view, one or more displays, and one or more processors implemented in circuitry. The one or more processors are configured to output a representation of the eye pose data to the host device and extract one or more depth values for a rendered frame from depth data output by the host device. Each one of the one or more depth values indicating a weighted depth value for a plurality of pixels of the rendered frame. The rendered frame is generated using the eye pose data. The one or more processors are further configured to modify one or more pixel values of the rendered frame using the one or more depth values to generate a warped rendered frame and output, for display at the one or more displays, the warped rendered frame.

Additionally, host device 10 represents an example of a host device connected to a wearable display device. The host device comprising one or more processors implemented in circuitry that are configured to generate image content information for a rendered frame based on eye pose data received from the wearable display device and generate one or more depth values using per-pixel depth data for the rendered frame. Each one of the one or more depth values indicating a weighted depth value for a plurality of pixels of the rendered frame. The one or more processors are further configured to send, to the wearable display device, the image content information for the rendered frame and depth data indicating the one or more depth values.

Figure 2:
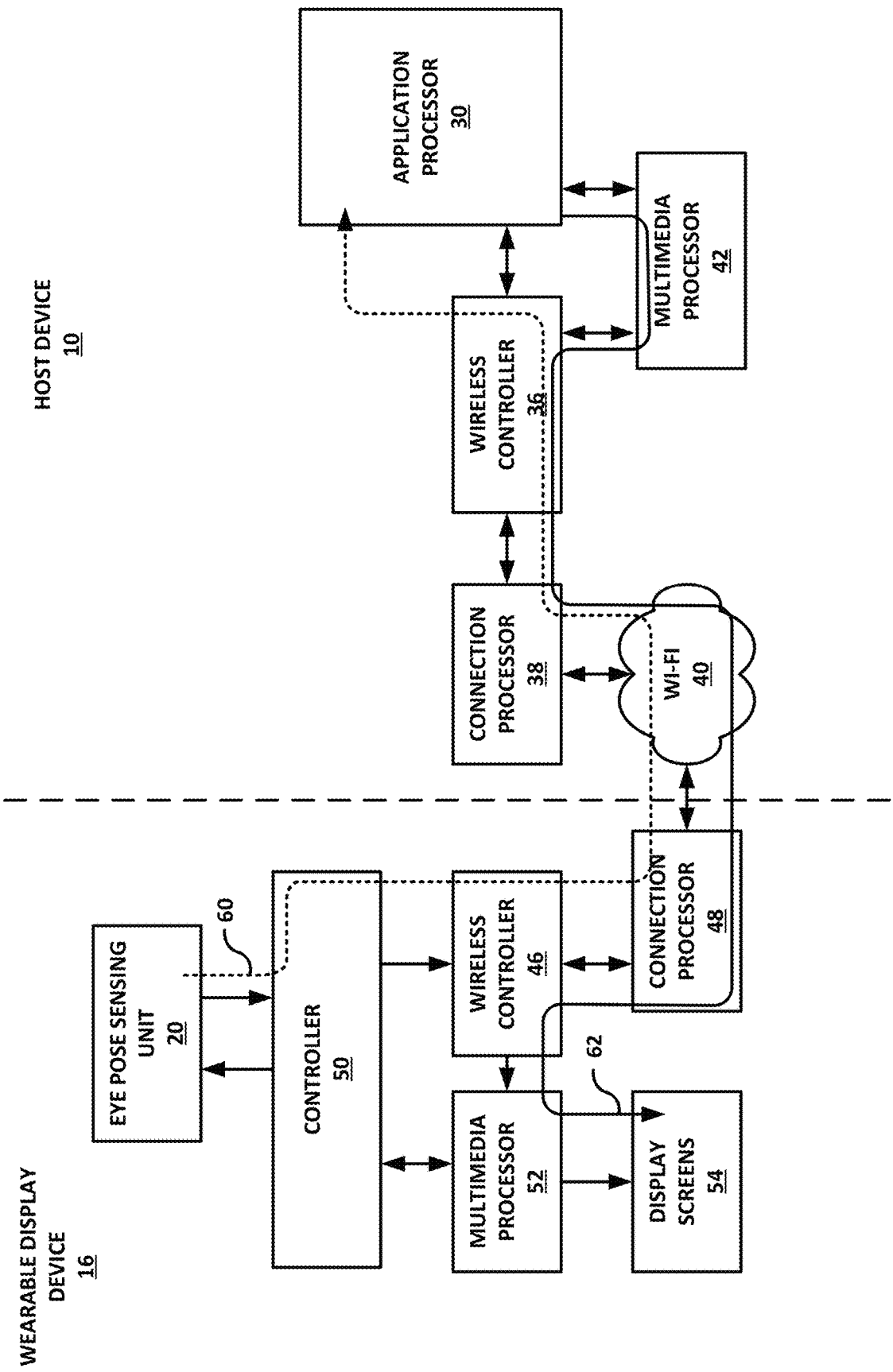
FIG. 2 is a block diagram illustrating the host device and wearable display device from FIG. 1 in greater detail.

FIG. 2 is a block diagram illustrating host device 10 and wearable display device 16 from FIG. 1 in greater detail. For purposes of this disclosure, host device 10 and wearable display device 16 will primarily be described as being wireless devices. For example, host device 10 may comprise a smart phone or smart pad, or other handheld WCD, and wearable display device 16 may comprise a WHMD device. In other examples, however, host device 10 and wearable display device 16 may comprise either wireless devices or wired devices with wireless communication capabilities.

In the example illustrated in FIG. 2, host device 10 includes an application processor 30, a wireless controller 36, a connection processor 38, and a multimedia processor 42. In other examples, host device 10 may comprise additional functional units or modules used to control and perform WCD operations.

Application processor 30 may comprise a general-purpose or a special-purpose processor that controls operation of host device 10. A user may provide input to host device 10 to cause application processor 30 to execute one or more software applications. The software applications that execute on application processor 30 may include, for example, an operating system, a word processor application, an email application, a spread sheet application, a media player application, a media editing application a video game application, a graphical user interface application, a teleconferencing application or another program. The user may provide input to host device 10 via one or more input devices (not shown) such as a keyboard, a mouse, a microphone, a touch pad or another input device that is coupled to host device 10.

The software applications that execute on application processor 30 may include one or more graphics rendering instructions that instruct multimedia processor 42 to cause the rendering of graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application processor 30 may issue one or more graphics rendering commands to multimedia processor 42 to cause multimedia processor 42 to perform some or all of the rendering of the graphics data. In some examples, the graphics data to be rendered may include a list of graphics primitives, e.g., points, lines, triangles, quadrilaterals, triangle strips, etc.

As illustrated in FIG. 2, wearable display device 16 includes eye pose sensing unit 20, wireless controller 46, connection processor 48, controller 50, multimedia processor 52, and display screens 54. Controller 50 comprises a main controller for wearable display device 16, and controls the overall operation of wearable display device 16.

Controller 50 may comprise a general-purpose or a special-purpose processor that controls operation of wearable display device 16. A user may provide input to wearable display device 16 to cause controller 50 to execute one or more software applications. The software applications that execute on controller 50 may include, for example, an operating system, a word processor application, an email application, a spread sheet application, a media player application, a media editing application a video game application, a graphical user interface application, a teleconferencing application or another program. The user may provide input wearable display device 16 via one or more input devices (not shown) such as a keyboard, a mouse, a microphone, a touch pad or another input device that is coupled to wearable display device 16.

The software applications that execute on controller 50 may include one or more graphics rendering instructions that instruct multimedia processor 52 to cause the rendering of graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application controller 50 may issue one or more graphics rendering commands to multimedia processor 52 to cause multimedia processor 52 to perform some or all of the rendering of the graphics data. In some examples, the graphics data to be rendered may include a list of graphics primitives, e.g., points, lines, triangles, quadrilaterals, triangle strips, etc.

Display screens 54 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display screens 54 may be integrated within wearable display device 16. For instance, display screens 54 may be a screen of a mobile telephone handset or a tablet computer. Alternatively, display screens 54 may be a stand-alone device coupled to wearable display device 16 via a wired or wireless communications link.

Eye pose sensing unit 20 may include sensors and/or actuators for generating depth data indicative of a user's field of view. For example, eye pose sensing unit 20 may generate eye pose data (e.g., via accelerometers, eye-tracking circuitry, and the like) that indicates an angle of rotation of wearable display device 16 and a position of wearable display device 16.

As shown, the transfer of eye pose data from wearable display device 16 to host device 10 is illustrated as a path 60. Specifically, controller 50 may receive eye pose data from eye pose sensing unit 20. Multimedia processor 52 may receive eye pose data from controller 50. Wireless controller 46 packages the eye pose data, and connection processor 48 transmits the packaged user input over Wi-Fi network 40 to host device 10. At host device 10, connection processor 38 receives the transmitted eye pose data, and wireless controller 36 unpackages the received user input for processing by multimedia processor 42. In this way, host device 10 may generate image eye pose for a particular eye pose of a user's field of view.

In general, host device 10 generates image content information for presentation at display screens 54. More specifically, multimedia processor 42 may generate image content information for a user's field of view that is indicated by eye pose data generated by eye pose sensing unit 20. For example, multimedia processor 42 may generate image content information that indicates one or more primitives arranged in a user's field of view that is indicated by eye pose data generated by eye pose sensing unit 20. In some examples, multimedia processor 42 may generate image content information that indicates a two-dimensional frame representative of the user's field of view.

In any case, multimedia processor 42 may have access to per-pixel depth values for generating the image content information. For example, multimedia processor 42 may have access to per-pixel depth values to determine whether primitives of a scene are visible in the user's field of view. As such, multimedia processor 42 may generate depth data using the per-pixel depth values. For example, multimedia processor 42 may generate one or more depth values for the image content information. For example, multimedia processor 42 may generate, using the per-pixel depth values, quantized depth data for each partition of a histogram of depth values for pixels of a rendered frame indicated by the image content information. In some examples, multimedia processor 42 may generate, using the per-pixel depth values, a single depth value for pixels of the rendered frame indicated by the image content information.

In the example of FIG. 2, wearable display device 16 may receive, via path 62, image content information and depth data from host device 10. To transfer image content information and depth data from host device 10 to wearable display device 16, path 62 may begin at application processor 30.

Application processor 30 provides an environment in which a variety of applications may run on host device 10. Application processor 30 may receive data for use by these applications from internal or external storage location and/or internal or external sensors or cameras associated with host device 10. The applications running on application processor 30, in turn, generate image content information for presentation to a user of host device 10 and/or wearable display device 16. In other examples, path 62 may begin at multimedia processor 42 or some other functional device that either generates image content information or receives image content information directly from the storage locations and/or sensors or cameras.

Multimedia processor 42 may process the received image content information for presentation on display screens 54 of wearable display device 16. Wireless controller 36 packages the processed data for transmission. Packaging the processed data may include grouping the data into packets, frames or cells that may depend on the wireless communication standard used over Wi-Fi network 40. Connection processor 38 then transmits the processed data to wearable display device 16 using Wi-Fi network 40. Connection processor 38 manages the connections of host device 10, including a P2P group communication session with wearable display device 16 over Wi-Fi network 40, and the transmission and receipt of data over the connections. Host device 10 may transmit depth data (e.g., eye buffer) as slices that are independently decodable to localize the effect of packet loss.

The transfer of the image content information and depth data continues along path 62 at wearable display device 16 when connection processor 48 receives the transmitted data from host device 10. Similar to connection processor 38 of host device 10, connection processor 48 of wearable display device 16 manages the connections of wearable display device 16, including a P2P group communication session with host device 10 over Wi-Fi network 40, and the transmission and receipt of data over the connections. Wireless controller 46 unpackages the received data for processing by multimedia processor 52.

In split-rendered systems, there is a possibility that the user changed his or her eyes or head from the position they were in when the request of the image content information was transmitted. To account for this change in position, multimedia processor 52 may retrieve image content information and warp the frame content (e.g., shift or rotate the image content) in the direction in which the user moved his or her eyes and/or head, in what is referred to as a warping round. Otherwise, the user may experience judder, which can negatively impact the experience.

More specifically, for example, multimedia processor 52 may warp the rendered frame using a texture map. For example, multimedia processor 52, controller 50, or some other processing circuit may define a mesh. This mesh may be the same size and shape as a frame portion. For instance, the mesh may be size and shape of a tile of the frame surface. The mesh may include a plurality of primitives defined by vertices, which are points on the mesh. As an example, a mesh may be a two-dimensional rectangular mesh with the same size as that of a tile or bin. The two-dimensional rectangular mesh includes primitives defined by vertices (e.g., a triangle is a primitive having three vertices). Each of the vertex may include an (x, y) coordinate.

In texture mapping, multimedia processor 52 may map vertices of primitives in a texture to primitives in the mesh. To avoid confusion, the coordinates of primitives in the texture may be referred to as (u, v) coordinates. Multimedia processor 52 may map a (u, v) coordinate of a vertex of a primitive in the texture to an (x, y) coordinate of vertex of a primitive in mesh (e.g., based on received commands that define the mapping). Multimedia processor 52 may redraw the texture primitive onto the primitive in the mesh based on the mapping. In this way, multimedia processor 52 shifts or rotates the image content.

However, rather than only using rotation information to warp the frame content, multimedia processor 52 may process the received image content information using depth data to generate a warped rendered frame for presentation on display screens 54. For example, multimedia processor 52 may apply post-rendering 3D warping as described in Mark, W., "Post-rendering 3D Warping," In Proceedings of 1997 Symposium on Interactive 3D Graphics, Providence, R.I., Apr. 27-30, 1997, pp. 7-16.

Further, rather than using per-pixel values of a Z-buffer, multimedia processor 52 may perform post-rendering warping on a rendered frame indicated by the received image content information using the received depth data. For example, multimedia processor 52 may receive one or more depth values from multimedia processor 42, where each depth value corresponds to a set of pixels of the rendered frame. It should be understood that the rendered frame may be generated by multimedia processor 52 using image content generated by multimedia processor 42 or, alternatively, the rendered frame may be generated by multimedia processor 42. In any case, multimedia processor 52 may perform one or more warping processes upon generating and/or receiving the rendered frame. In this example, multimedia processor 52 may perform post-rendered warping on the rendered frame using the multiple depth values. In some instances, multimedia processor 52 may warp each layer (e.g., a set of pixels associated with a particular depth value) separately (e.g., starting with the largest depth value) and overlap the added warped layers. In some instances, rather than warping each layer separately, multimedia processor 52 may generate a grid of vertices for textual mapping that spans all the layers and may warp the entire rendered frame in a single pass using the multiple depth values to avoid holes in the warped rendered frame.

Figure 3A:
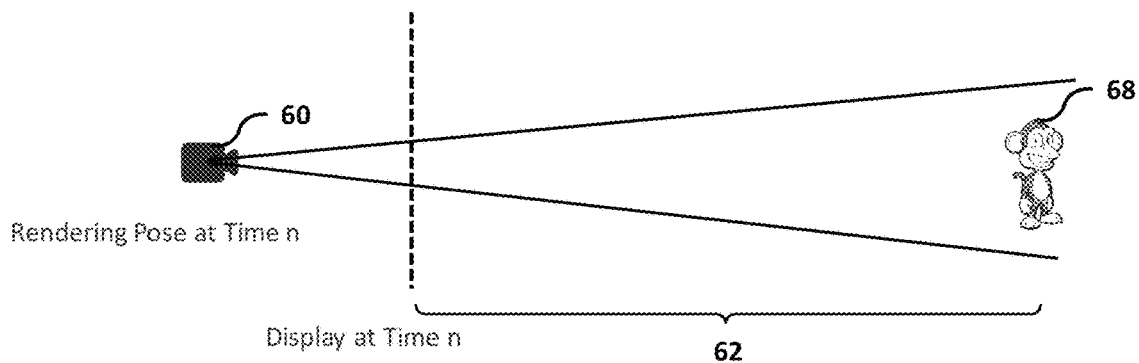
FIGS. 3A-3D are conceptual illustrations of an exemplary camera translation.
Figure 3B:
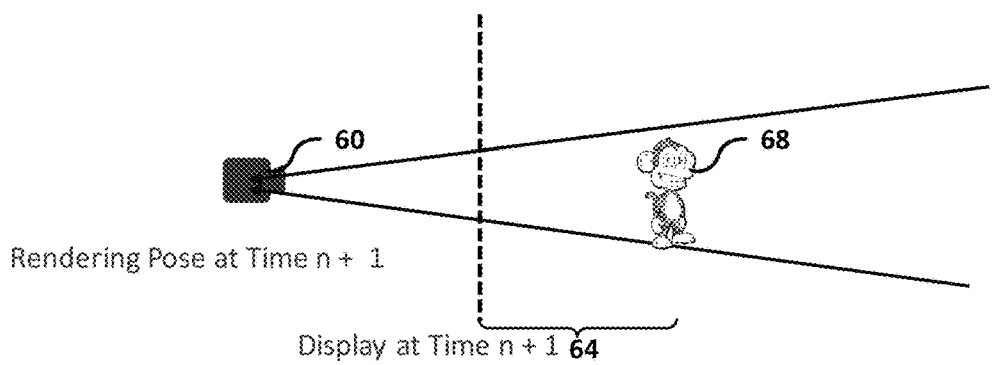
Figure 3C:
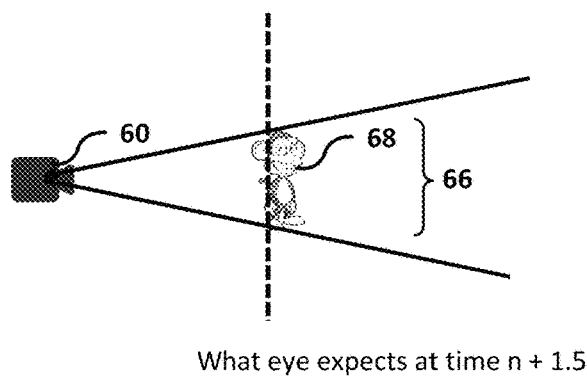

FIGS. 3A-3D are conceptual illustrations of an exemplary camera translation. As shown in FIG. 3A, at time 'n', camera 60 is positioned at first depth 62 in a virtual space from object 68. It should be understood that camera 60 may be a virtual camera that corresponds to an eye pose of the user within a virtual space. As shown in FIG. 3B, a camera translation between time 'n' and time 'n+1' causes camera 60 to be positioned at second depth 64 in a virtual space from object 68. For instance, a user may walk towards object 68 such that wearable display device 16 is positioned closer to object 68 in the virtual space. Additionally, or alternatively, object 68 may be moved closer to the user wearing wearable display device 16.

Figure 3D:
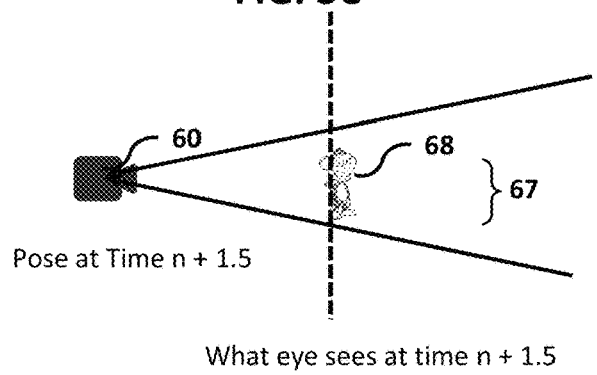

In any case, the user of wearable display device 16 may expect to see object 64 mapped on a two-dimensional frame to have size 66 that accounts for the camera translation (e.g., head translation) between time 'n' and time 'n+1.5'. However, warping without using depth data may result in the user seeing object 68 being mapped on the two-dimensional frame to have size 67 as shown in FIG. 3D. Specifically, object 68 in FIG. 3D appears at size 67, which is substantially smaller than size 66 of object 68 of FIG. 3C. This difference may result in position judder especially when object 68 is relatively near the user in the virtual space.

Figure 4:
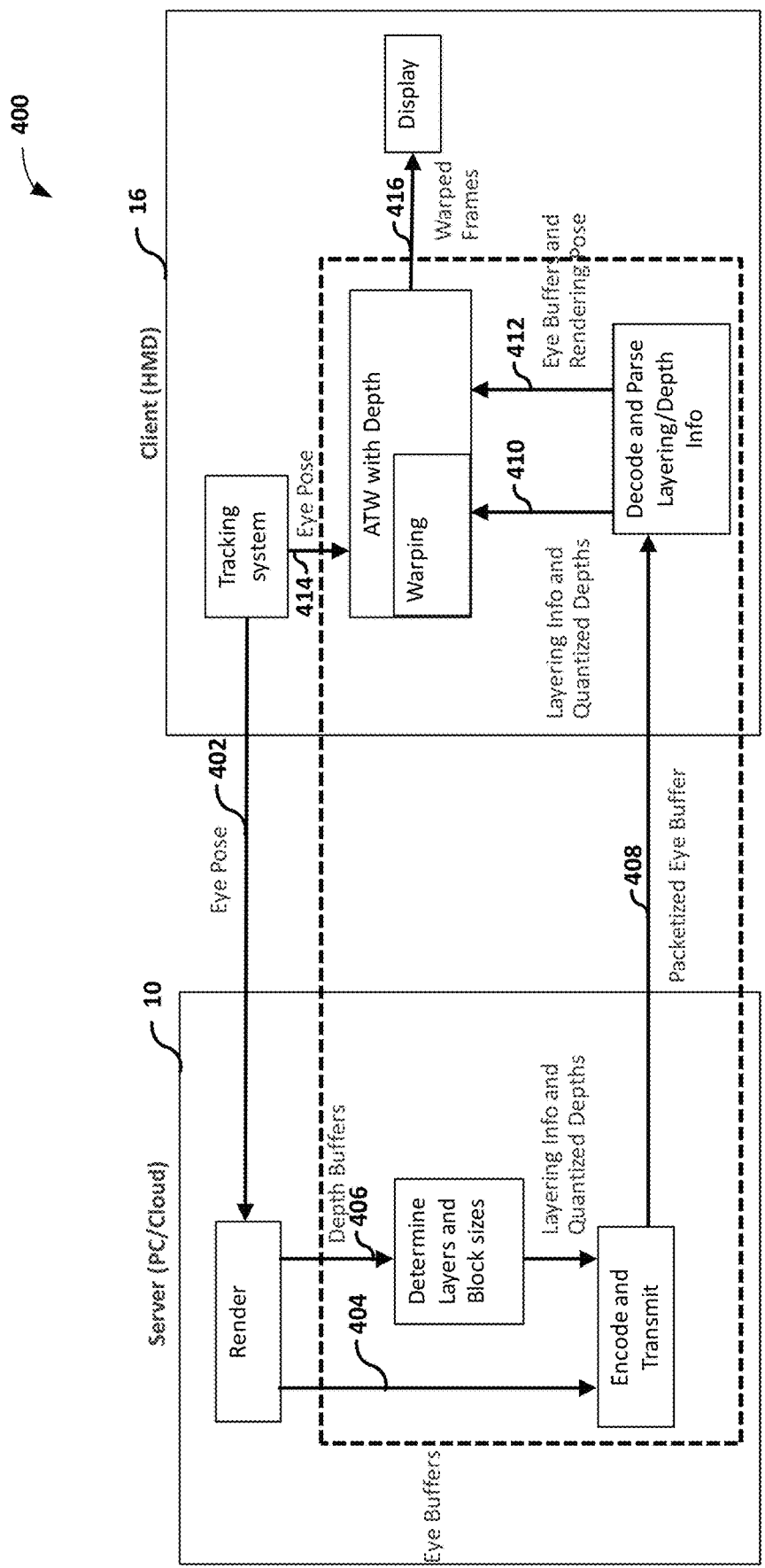
FIG. 4 is a conceptual diagram illustrating an example process for warping a rendered frame to correct for a camera translation, in accordance with one or more techniques described in this disclosure.

FIG. 4 is a conceptual diagram illustrating an example process 400 for warping a rendered frame to correct for a camera translation, in accordance with one or more techniques described in this disclosure. FIG. 4 is discussed within the context of FIG. 2 for exemplary purposes only.

Eye pose sensing unit 20 generates eye pose data that indicates an angle of rotation of wearable display device 16 and a position of wearable display device 16 at time 'n'. As shown, the depth data transfers from wearable display device 16 to host device 10 (402). For example, multimedia processor 52 of host device 10 may receive depth data from eye pose sensing unit 20 using wireless controller 46.

Multimedia processor 42 may generate eye buffers (e.g., image content information) using per-pixel depth values (404). Additionally, as shown, multimedia processor 42 may generate depth buffers (e.g., depth data) (406) using per-pixel depth values. For example, multimedia processor 42 may generate, using the per-pixel depth values, quantized depth data for each partition of a histogram of depth values for pixels of a rendered frame indicated by the image content information. In some examples, multimedia processor 42 may generate, using the per-pixel depth values, a single depth value for pixels of the rendered frame indicated by the image content information. Connection processor 48 encodes and transmits packetized depth buffers and packetized eye buffers to wearable display device 16 (408).

Connection processor 38 decodes and parses depth data (410) and eye buffers (412). Eye pose sensing unit 20 generates eye pose data that indicates an angle of rotation of wearable display device 16 and a position of wearable display device 16 at time 'n+1' (414). Multimedia processor 52 of wearable display device 16 processes the received eye buffers using the received depth data and the eye pose data at time 'n+1'. For example, multimedia processor 52 may extract multiple depth values from the received depth data, where each depth value corresponds to a set of pixels of a rendered frame indicated by the received eye buffers. In this example, multimedia processor 52 may perform post-rendered warping on the rendered frame using the multiple depth values. For example, multimedia processor 52 may warp each layer (e.g., a set of pixels associated with a particular depth value) separately (e.g., starting with the largest depth value) and overlap the added warped layers. In some examples, rather than warping each layer separately, multimedia processor 52 may generate a grid of vertices for textual mapping that spans all the layers and may warp the entire rendered frame in a single pass using the multiple depth values to avoid holes in the warped rendered frame. In some examples, multimedia processor 52 may extract a single depth value from the received depth data, where the single depth value corresponds to all of the pixels of a rendered frame indicated by the received eye buffers. In any case, after performing post-rendered warping on the rendered frame, multimedia processor 52 may output, at time 't+1', a warped rendered frame for display at display screens 54 (416).

Figure 5:
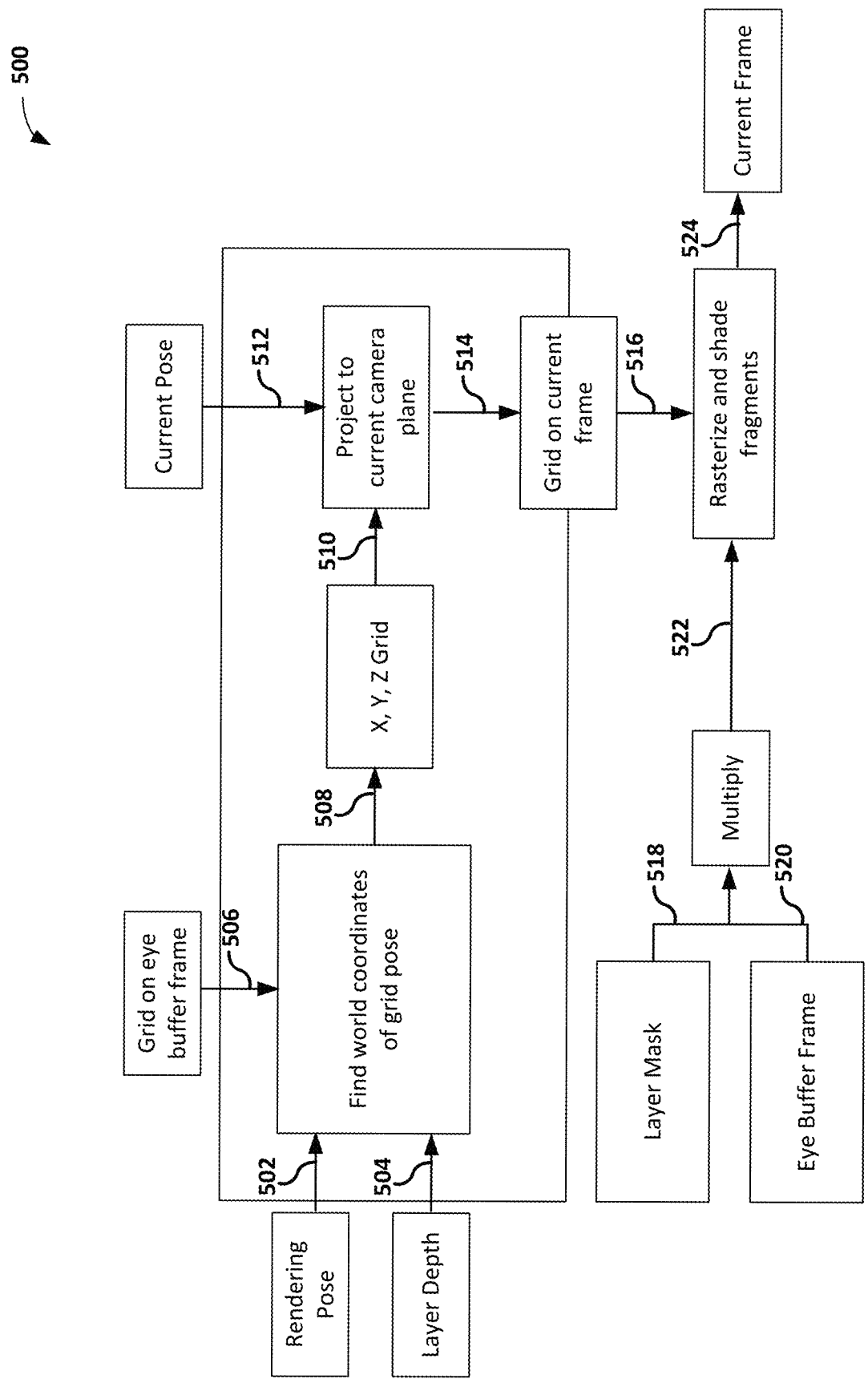
FIG. 5 is a conceptual diagram illustrating an example process for textual mapping to correct for a camera translation, in accordance with one or more techniques described in this disclosure.

FIG. 5 is a conceptual diagram illustrating an example process 500 for textual mapping to correct for a camera translation, in accordance with one or more techniques described in this disclosure. FIG. 5 is discussed within the context of FIG. 2 for exemplary purposes only.

Controller 50 may generate commands that instruct multimedia processor 52 to receive a rendering pose (502). For instance, multimedia processor 52 may receive an eye pose (e.g., receive information of the pitch, roll, and/or yaw and/or acceleration) at time 'n' from eye pose sensing unit 20. Controller 50 may generate commands that instruct multimedia processor 52 to receive a layer depth (e.g., depth data) (504). For example, multimedia processor 52 may receive quantized depth data for a particular partition of a histogram of depth values for pixels of the rendered frame indicated by an eye buffer frame. In some examples, the quantized depth data may be transmitted in a header of each eye buffer frame. In some examples, multimedia processor 52 may receive a single depth value for all of the pixels of the rendered frame. In some examples, the single depth value for all of the pixels of the rendered frame may be transmitted in a header of each eye buffer frame.

In some examples, multimedia processor 52 may receive layer depth data via motion vectors. In instances when the eye buffer is transmitted for both eyes (which have slightly different poses), host device 10 may encode the motion vectors such that the motion vectors for one eye refer to blocks in the frame for the other eye. Such encoding may provide correspondences between the two eye buffer frames which can then be used by multimedia processor 52 to determine the depth of blocks in each frame using depth from disparity. Alternatively, or additionally, multimedia processor 52 may propagate the depth of each block to all pixels within the block and post rendering warping may be used. For example, multimedia processor 52 may propagate the depth of each block to all pixels within the block and post-rendering 3D warping as described in Mark, W., "Post-rendering 3D Warping," In Proceedings of 1997 Symposium on Interactive 3D Graphics, Providence, R.I., Apr. 27-30, 1997, pp. 7-16 may be used.

In the example of FIG. 5, multimedia processor 52 receives a grid for the eye buffer frame (506). Multimedia processor 52 may adaptively change the granularity of blocks and triangles at edges of layers. For example, when host device 10 sends the layer information on a per-block basis, multimedia processor 52 may increase the granularity of the blocks close to edges of layers, to increase the accuracy of warping. Further, multimedia processor 52 may modify grid triangles so that at layer edges, triangles containing foreground textures have edges that largely align with layer edges and such that bordering triangles that are just outside are larger than usual (e.g., larger than a typical triangle size of the grid) so that if disocclusions occur the stretching of the triangle is distributed over a larger area.

Multimedia processor 52 may determine world coordinates of the grid pose using the received rendered pose data and the received layer depth (508). It should be understood that for instances using a single depth value (e.g., single layer), the implied transformation of grid points is a homography because all the points in the eye buffer frame may be assumed to be on a single plane.

Multimedia processor 52 converts the world coordinates to a local X, Y, Z grid (510). Controller 50 may generate commands that instruct multimedia processor 52 to receive a current pose (512). For instance, eye pose sensing unit 20 may output an eye pose at time 'n+1'. Multimedia processor 52 may project the current pose to a current camera plane (514) and output a grid for a current frame (516).

Controller 50 may generate commands that instruct multimedia processor 52 to receive a layer mask (518). For example, controller 50 may generate commands that instruct multimedia processor 52 to receive an image indicating whether each pixel of the eye buffer frame is included in a corresponding layer. For instance, multimedia processor 52 may receive an image indicating a '0' pixel value when a particular pixel of the eye buffer frame is not included in a corresponding layer and indicating a '1' pixel value when a particular pixel of the eye buffer frame is included in the corresponding layer. Alternatively, multimedia processor 52 may receive an indication of a macroblock assigned to a respective partition. For example, rather than receiving an image indicating every pixel of the eye buffer frame that is included, multimedia processor 52 may receive a macroblock identifier and determine the pixels of the corresponding partition using the macroblock identifier. It should be understood that when a single depth value is used, process 500 may omit receiving a layer mask. In any case, multimedia processor 52 may receive an eye buffer frame (520).

In response to receiving a layer mask (518) and eye buffer frame (e.g., image content information) (520), multimedia processor 52 multiplies the layer mask with the eye buffer frame (522). For example, multimedia processor 52 may determine, for each partition of the histogram, pixels assigned to a respective partition using the layer mask and may modify, for each partition of the histogram, at least one pixel value for a pixel of pixels assigned to the respective partition using quantized depth data for the respective partition. In response to receiving the grid on current frame and the result of multiplying the layer mask to the eye buffer frame, multimedia processor 52 rasterizes the current eye buffer frame and shade fragments using the grid on current frame to generate a current frame (524). For example, controller 50 may cause multimedia processor 52 to map the eye buffer frame to points on the grid that causes the eye buffer frame to rotate and modify the eye buffer frame to correct for a camera translation between time 'n' and time 'n+1'. For instance, the vertices in the grid may be rotated, and therefore, the eye buffer frame is rotated. Additionally, controller 50 may cause multimedia processor 52 to map the eye buffer frame to points on the grid that causes the eye buffer frame to resize objects of the eye buffer frame to correct for camera translation.

More specifically, for example, controller 50 may cause multimedia processor 52 to map a texture primitive onto a two-dimensional or three-dimensional mesh, and in this example, a two-dimensional rectangular mesh. For instance, a texture hardware unit of multimedia processor 52 may stretch or otherwise modify frame content from the textures, and effectively place the modified frame content onto the rectangular mesh. As one example, multimedia processor 52 may map each vertex of a texture primitive to respective points on the rectangular mesh, and may then render the rectangular mesh to generate a warped rendered frame.

The above process may repeat for each layer until process 500 generates an unblended rendered frame. In some examples, controller 50 may determine an order for processing each partition of the histogram based on quantized depth data for a respective partition. For example, controller 50 may determine an order for processing each partition of the histogram such controller 50 orders the partitions associated with a relatively large depth value compared to other partitions before the other partitions. In this example, controller 50 may generate commands that instruct multimedia processor 52 to modify, for each partition of the histogram, in the determined order, at least one pixel value for a pixel arranged in a respective partition of the rendered frame using quantized depth data for a respective partition to generate an unblended rendered frame. In some examples, process 500 may further include multimedia processor 52 blending the unblended rendered frame to generate a warped rendered frame.

Additionally, or alternatively, rather than warp each layer separately (and overlapping added warped layers), multimedia processor 52 may generate the grid of vertices to span all layers. In this example, multimedia processor 52 may warp the rendered frame in a single pass to avoid holes in the warped rendered frame.

Figure 6:
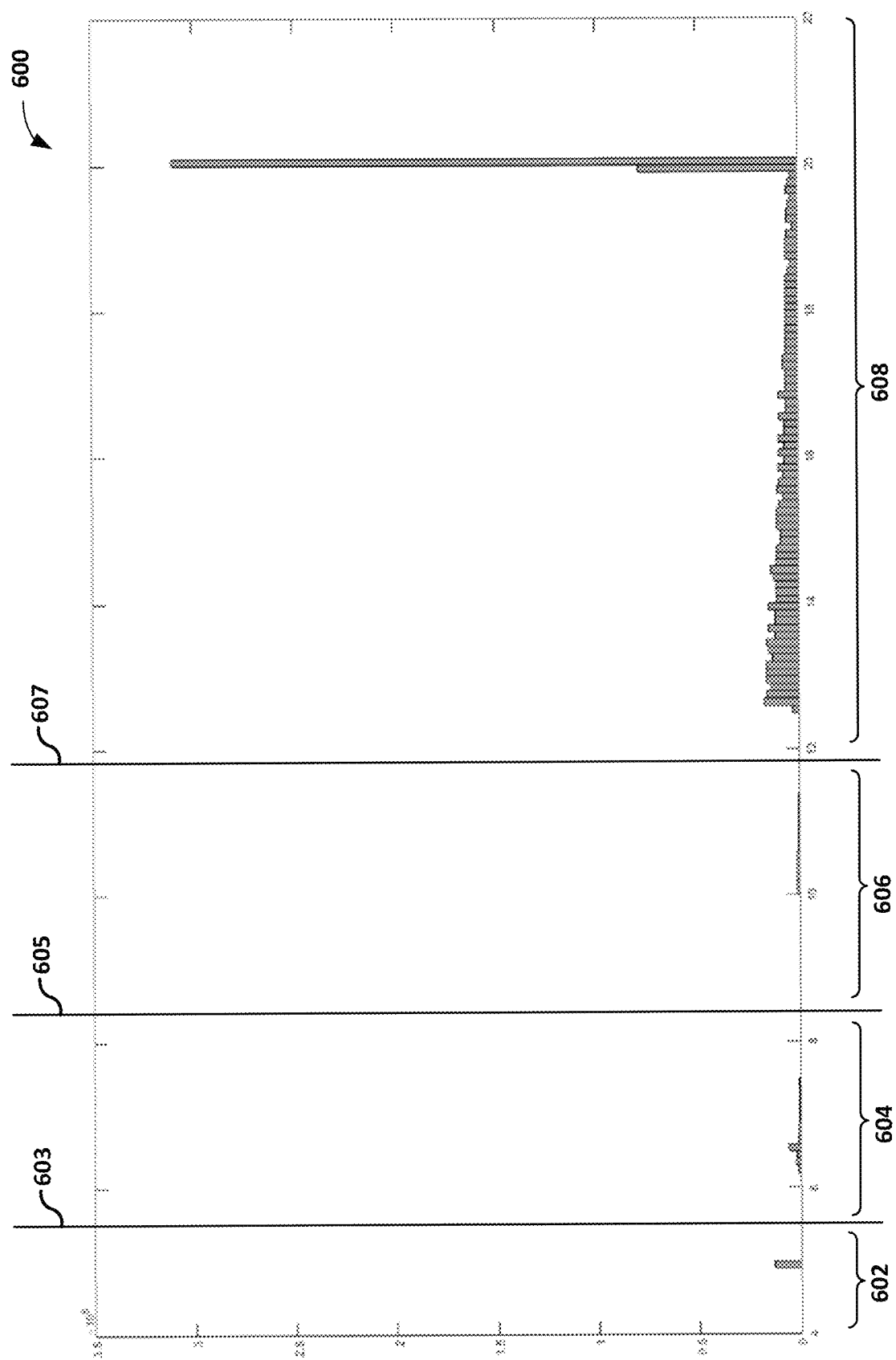
FIG. 6 is a conceptual diagram illustrating example partitions of a histogram of depth values for pixels of a rendered frame, in accordance with one or more techniques described in this disclosure.

FIG. 6 is a conceptual diagram illustrating example partitions of histogram 600 of depth values for pixels of a rendered frame, in accordance with one or more techniques described in this disclosure. FIG. 6 is discussed within the context of FIG. 2 for exemplary purposes only.

In the example of FIG. 6, application processor 30 computes histogram 600. Further, application processor 30 may divide histogram 600 into multiple partitions. More specifically, application processor 30 may divide histogram 600 into partitions at depth space values that include zero pixels of the rendered frame. As shown, partition 602 and partition 604 are divided at depth space value 603 that include zero pixels. Similarly, partition 604 and partition 606 are divided at depth space value 605 that include zero pixels and partition 606 and partition 608 are divided at depth space value 607 that include zero pixels. In some examples, partitions 602, 604, 606, and 608 may be divided at a center depth value of a cluster of depth values. For instance, depth space value 602 may be positioned at a midpoint of a cluster of depth values having zero pixels. Alternatively, application processor 30 may divide the histogram into a pre-determined quantity of partitions (not shown).

Application processor 30 may compute a weighted depth value for each one of partitions 602, 604, 606, and 608. In some examples, application processor 30 computes a weighted depth value corresponding to a weighted average depth of pixels arranged in a respective partition. For instance, application processor 30 computes a weighted depth value for partition 602 that corresponds to a weighted average depth of pixels arranged in partition 602. In some examples, application processor 30 computes a weighted depth value to correspond to an minimum depth of pixels arranged in a respective partition. For instance, application processor 30 computes a weighted depth value for partition 602 that corresponds to a minimum depth of pixels arranged in partition 602. In some examples, application processor 30 computes a weighted depth value to correspond to a maximum depth of pixels arranged in a respective partition. For instance, application processor 30 computes a weighted depth value for partition 602 that corresponds to a maximum depth of pixels arranged in partition 602. In some examples, application processor 30 computes a weighted depth value to correspond to a mean foveal depth of pixels arranged in a respective partition. For instance, application processor 30 computes a weighted depth value for partition 602 that corresponds to a mean foveal depth of pixels arranged in partition 602.

Figure 7:
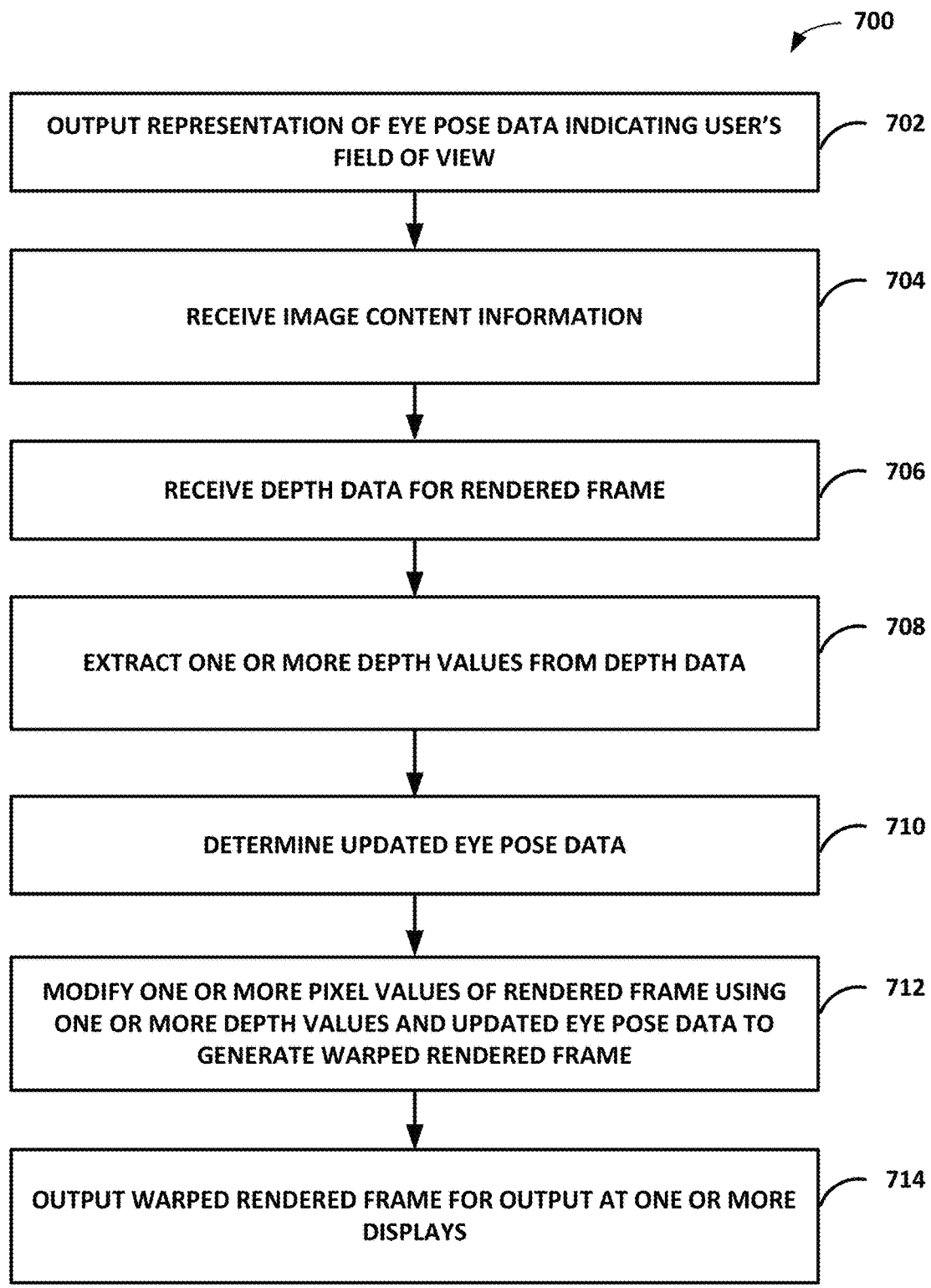
FIG. 7 is a flowchart illustrating an example process of warping a rendered frame to correct for a camera translation, in accordance with one or more techniques described in this disclosure.

FIG. 7 is a flowchart illustrating an example process 700 of warping a rendered frame to correct for a camera translation, in accordance with one or more techniques described in this disclosure. FIG. 7 is discussed within the context of FIG. 2, process 400 of FIG. 4, process 500 of FIG. 5, and histogram 600 of FIG. 6, for exemplary purposes only.

Eye pose sensing unit 20 outputs a representation of eye pose data indicating a user's field of view (702). For example, eye pose sensing unit 20 outputs a representation of eye pose data indicating a user's field of view at time 'n'. Multimedia processor 52 receives image content information (704). For example, multimedia processor 52 receives a rendered frame from host device 10. In some examples, multimedia processor 52 receives image content information and generates the rendered frame using the image content information.

In any case, multimedia processor 52 receives depth data for the rendered frame (706). Controller 50 extracts one or more depth values from the depth data (708). For example, controller 50 receives quantized depth data for each partition of histogram 600. In some examples, controller 50 extracts a single depth value for all pixels of the rendered frame.

Eye pose sensing unit 20 outputs a representation of updated eye pose data indicating a user's field of view (710). For example, eye pose sensing unit 20 outputs a representation of eye pose data indicating a user's field of view at time 'n+1'. Multimedia processor 52 modifies one or more pixel value of the rendered frame using the one or more depth values and the updated eye pose data to generate a warped rendered frame (712). For example, multimedia processor 52, for each partition of histogram 600, rasterizes a current eye buffer frame determined using the updated eye pose data to generate the warped frame. Multimedia processor 52 outputs a warped rendered frame for output at one or more displays (714). For example, multimedia processor 52 outputs a warped rendered frame for output display screens 54.

Figure 8:
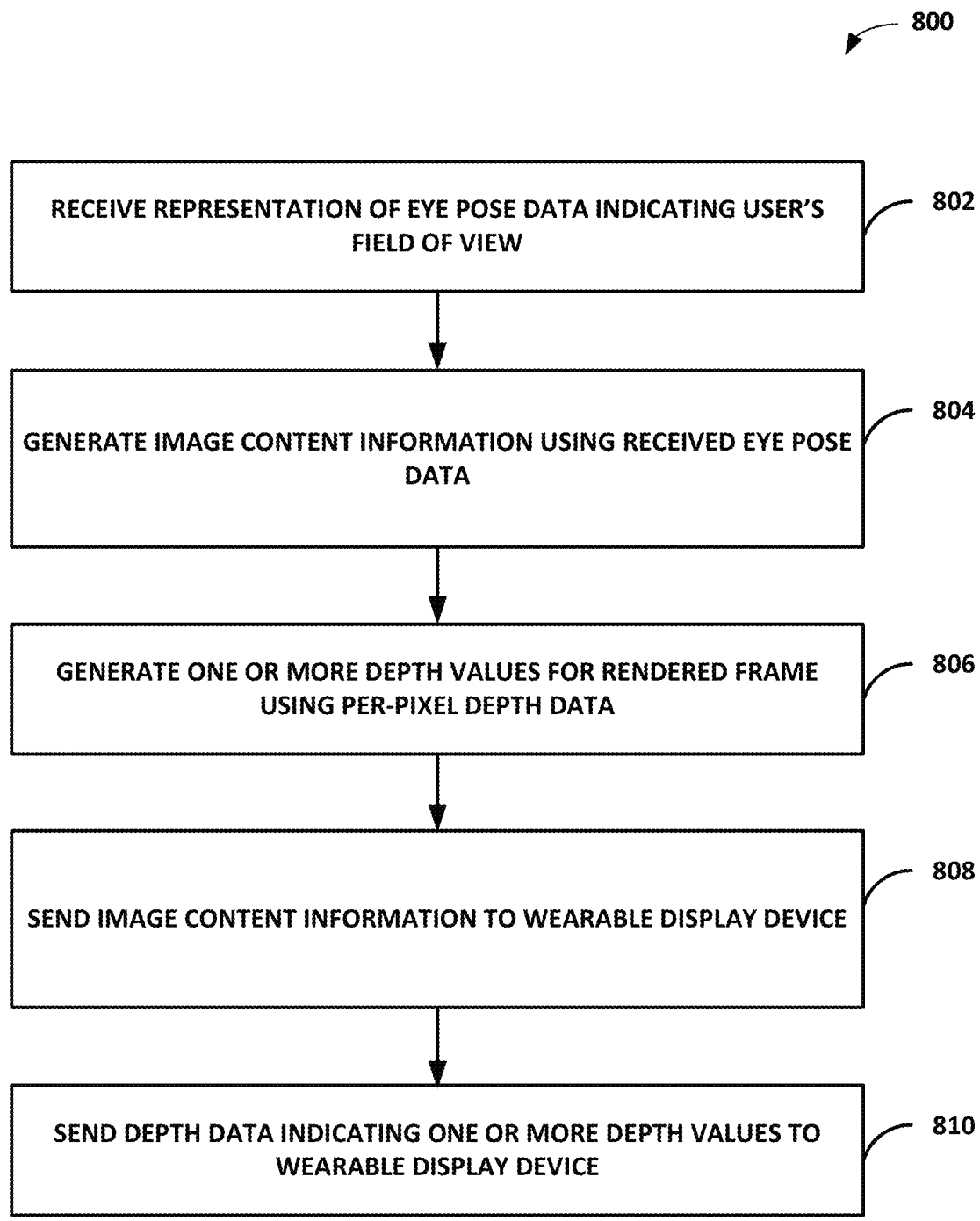
FIG. 8 is a flowchart illustrating an example process of generating one or more depth values using per-pixel depth data for warping a rendered frame to correct for a camera translation, in accordance with one or more techniques described in this disclosure.

FIG. 8 is a flowchart illustrating an example process 800 of generating one or more depth values using per-pixel depth data for warping a rendered frame to correct for a camera translation, in accordance with one or more techniques described in this disclosure. FIG. 8 is discussed within the context of FIG. 2, process 400 of FIG. 4, process 500 of FIG. 5, and histogram 600 of FIG. 6, for exemplary purposes only.

Application processor 30 receives a representation of eye pose data indicating a user's field of view (802). For example, application processor 30 receives a representation of eye pose data that was generated by eye pose sensing unit 20 and indicates a user's field of view at time 'n'. Multimedia processor 42 generates image content information using the received eye pose data (804). For example, multimedia processor 42 generates a rendered frame. In some examples, multimedia processor 42 generates image content information that may be used by multimedia processor 52 to generate the rendered frame.

In any case, multimedia processor 42 generates depth data for the rendered frame using per-pixel depth data (806). For example, multimedia processor 42 generates quantized depth data for each partition of histogram 600. In some examples, multimedia processor 42 generates a single depth value for all pixels of the rendered frame. Connection processor 48 sends the image content information to wearable display device 16 (808). Additionally, connection processor 48 sends the depth data indicating the one or more depth values to wearable display device 16 (810).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A wearable display device connected to a host device, the wearable display device comprising:
one or more sensors configured to generate eye pose data indicating a user's field of view;
one or more displays; and
one or more processors implemented in circuitry that are configured to:
output a representation of the eye pose data indicating the user's field of view at a first time to the host device;
receive depth data output by the host device indicating a plurality of depth values for a rendered frame for the user's field of view at the first time, each one of the plurality of depth values specifying a single weighted depth value for at least two pixels of the rendered frame, wherein the rendered frame is generated using the eye pose data indicating the user's field of view at the first time;
extract the plurality of depth values for the rendered frame from the depth data output by the host device, wherein, to extract the plurality of depth values, the one or more processors are configured to extract, for each partition of a plurality of partitions of a histogram of depth values for a plurality of pixels of the rendered frame, a respective depth value of the plurality of depth values and wherein the histogram is divided into at least a first partition of the plurality of partitions and a second partition of the plurality of partitions at a depth value of the histogram that includes zero pixels of the rendered frame;
modify one or more pixel values of the rendered frame for the user's field of view at the first time using the plurality of depth values and the user's field of view at a second time to generate a warped rendered frame, wherein, to modify the one or more pixel values, the one or more processors are configured to map the rendered frame to points on a grid that causes the rendered frame to resize one or more objects of the rendered frame to correct for a camera translation of the user's field of view from the first time to the second time, wherein the camera translation represents a movement of the user's field of view closer or further from the one or more objects of the rendered frame; and
output, for display at the one or more displays, the warped rendered frame.

2. The wearable display device of claim 1, wherein, to extract the plurality of depth values, the one or more processors are configured to extract quantized depth data for each partition of the histogram of depth values for the plurality of pixels of the rendered frame and wherein, to modify the one or more pixel values, the one or more processors are configured to modify the one or more pixel values using the quantized depth data.

3. The wearable display device of claim 2, wherein the one or more processors are configured to extract mask data from the depth data output by the host device, the mask data indicating two or more pixels of the rendered frame arranged in each partition of the histogram, wherein, to modify the one or more pixel values using the quantized depth data, the one or more processors are configured to:
determine, for each partition of the histogram, a plurality of pixels assigned to a respective partition using the mask data; and
modify, for each partition of the histogram, at least one pixel value for a pixel of the plurality of pixels assigned to the respective partition using quantized depth data for a respective partition.

4. The wearable display device of claim 3, wherein, to extract mask data, the one or more processors are configured to extract, for each partition of the histogram, a macroblock assigned to a respective partition, wherein the macroblock indicates the plurality of pixels assigned to the respective partition.

5. The wearable display device of claim 2, wherein, to modify the one or more pixel values, the one or more processors are configured to:
determine an order for processing each partition of the histogram based on quantized depth data for a respective partition;
modify, for each partition of the histogram, in the determined order, at least one pixel value for a pixel arranged in a respective partition of the rendered frame using quantized depth data for a respective partition to generate an unblended rendered frame; and
blend the unblended rendered frame to generate the warped rendered frame.

6. The wearable display device of claim 1, wherein the single weighted depth value is determined by the host device using a first weighted depth value and a second weighted depth value, wherein the plurality of pixels of the rendered frame comprises a first set of pixels and a second set of pixels, wherein a first weighting factor is applied to a depth value for the first set of pixels to generate the first weighted depth value, wherein a second weighting factor is applied to a depth value for the second set of pixels to generate the second weighted depth value, and wherein the first weighting factor has a different value than the second weighting factor.

7. The wearable display device of claim 1, wherein the one or more processors are configured to:
receive image content information from the host device; and
generate the rendered frame using the image content information.

8. The wearable display device of claim 1,
wherein a first depth value of the plurality of depth values specifies a first single weighted depth value for a first plurality of pixels arranged in the first partition of the rendered frame; and
wherein a second depth value of the plurality of depth values specifies a second single weighted depth value for a second plurality of pixels arranged in the second partition of the rendered frame.

9. A method comprising:
outputting, by a processor implemented in circuitry, a representation of eye pose data indicating a user's field of view at a first time to a host device;
receiving, by the processor, depth data output by the host device indicating a plurality of depth values for a rendered frame for the user's field of view at the first time, each one of the plurality of depth values specifying a single weighted depth value for at least two pixels of the rendered frame, wherein the rendered frame is generated using the eye pose data indicating the user's field of view at the first time;
extracting, by the processor, the plurality of depth values for the rendered frame from the depth data output by the host device, wherein extracting the plurality of depth values comprises extracting, for each partition of a plurality of partitions of a histogram of depth values for a plurality of pixels of the rendered frame, a respective depth value of the plurality of depth values and wherein the histogram is divided into at least a first partition of the plurality of partitions and a second partition of the plurality of partitions at a depth value of the histogram that includes zero pixels of the rendered frame;
modifying, by the processor, one or more pixel values of the rendered frame for the user's field of view at the first time using the plurality of depth values and the user's field of view at a second time to generate a warped rendered frame, wherein modifying the one or more pixel values comprises mapping the rendered frame to points on a grid that causes the rendered frame to resize one or more objects of the rendered frame to correct for a camera translation of the user's field of view from the first time to the second time, wherein the camera translation represents a movement of the user's field of view closer or further from the one or more objects of the rendered frame; and
outputting, by the processor, for display at one or more displays, the warped rendered frame.

10. The method of claim 9, wherein extracting the plurality of depth values comprises extracting quantized depth data for each partition of the histogram of depth values for the plurality of pixels of the rendered frame and wherein modifying the one or more pixel values comprises modifying the one or more pixel values using the quantized depth data.

11. The method of claim 10, further comprising extracting, by the processor, mask data from the depth data output by the host device, the mask data indicating two or more pixels of the rendered frame arranged in each partition of the histogram, wherein modifying the one or more pixel values using the quantized depth data comprises:
determining, for each partition of the histogram, a plurality of pixels assigned to a respective partition using the mask data; and
modifying, for each partition of the histogram, at least one pixel value for a pixel of the plurality of pixels assigned to the respective partition using quantized depth data for a respective partition.

12. The method of claim 11, wherein extracting mask data comprises extracting, for each partition of the histogram, a macroblock assigned to a respective partition, wherein the macroblock indicates the plurality of pixels assigned to the respective partition.

13. The method of claim 10, wherein modifying the one or more pixel values comprises:
determining an order for processing each partition of the histogram based on quantized depth data for a respective partition;
modifying, for each partition of the histogram, in the determined order, at least one pixel value for a pixel arranged in a respective partition of the rendered frame using quantized depth data for a respective partition to generate an unblended rendered frame; and
blending the unblended rendered frame to generate the warped rendered frame.

14. The method of claim 9, wherein the single weighted depth value is determined by the host device using a first weighted depth value and a second weighted depth value, wherein the plurality of pixels of the rendered frame comprises a first set of pixels and a second set of pixels, wherein a first weighting factor is applied to a depth value for the first set of pixels to generate the first weighted depth value, wherein a second weighting factor is applied to a depth value for the second set of pixels to generate the second weighted depth value, and wherein the first weighting factor has a different value than the second weighting factor.

15. The method of claim 9, further comprising:
receiving image content information from the host device; and
generating, by the processor, the rendered frame using the image content information.

16. A non-transitory computer-readable storage medium having stored thereon instructions that, when executed, cause a processor of a wearable display device to:
output a representation of eye pose data indicating a user's field of view at a first time to a host device;
receive depth data output by the host device indicating a plurality of depth values for a rendered frame for the user's field of view at the first time, each one of the plurality of depth values specifying a single weighted depth value for at least two pixels of the rendered frame, wherein the rendered frame is generated using the eye pose data indicating the user's field of view at the first time;
extract the plurality of depth values for the rendered frame from the depth data output by the host device, wherein, to extract the plurality of depth values, the instructions cause the processor to extract, for each partition of a plurality of partitions of a histogram of depth values for a plurality of pixels of the rendered frame, a respective depth value of the plurality of depth values and wherein the histogram is divided into at least a first partition of the plurality of partitions and a second partition of the plurality of partitions at a depth value of the histogram that includes zero pixels of the rendered frame;

modify one or more pixel values of the rendered frame for the user's field of view at the first time using the plurality of depth values and the user's field of view at a second time to generate a warped rendered frame, wherein, to modify the one or more pixel values, the instructions further cause the processor to map the rendered frame to points on a grid that causes the rendered frame to resize one or more objects of the rendered frame to correct for a camera translation of the user's field of view from the first time to the second time, wherein the camera translation represents a movement of the user's field of view closer or further from the one or more objects of the rendered frame; and output, for display at one or more displays of the wearable display device, the warped rendered frame.

17. The non-transitory computer-readable storage medium of claim 16, wherein the instructions that cause the processor to extract the plurality of depth values comprises instructions that cause the processor to extract quantized depth data for each partition of the histogram of depth values for the plurality of pixels of the rendered frame and wherein the instructions that cause the processor to modify the one or more pixel values comprises instructions that cause the processor to modify the one or more pixel values using the quantized depth data.

18. The non-transitory computer-readable storage medium of claim 17, wherein the instructions further cause the processor to extract mask data from the depth data output by the host device, the mask data indicating two or more pixels of the rendered frame arranged in each partition of the histogram, wherein the instructions that cause the processor to modify the one or more pixel values using the quantized depth data comprises instructions that cause the processor to:

determine, for each partition of the histogram, a plurality of pixels assigned to a respective partition using the mask data; and modify, for each partition of the histogram, at least one pixel value for a pixel of the plurality of pixels assigned to the respective partition using quantized depth data for a respective partition.

19. The non-transitory computer-readable storage medium of claim 18, wherein the instructions that cause the processor to extract mask data comprises instructions that cause the processor to extract, for each partition of the histogram, a macroblock assigned to a respective partition, wherein the macroblock indicates the plurality of pixels assigned to the respective partition.

20. A host device connected to a wearable display device, the host device comprising one or more processors implemented in circuitry that are configured to:

generate image content information for a rendered frame based on eye pose data indicating a user's field of view at a first time and received from the wearable display device;

divide a histogram of depth values for a plurality of pixels of the rendered frame into a plurality of partitions, wherein, to divide the histogram, the one or more processors are configured to divide at least a first partition of the plurality of partitions and a second partition of the plurality of partitions at a depth value of the histogram that includes zero pixels of the rendered frame;

generate a plurality of depth values using per-pixel depth data for the plurality of pixels of the rendered frame, each one of the plurality of depth values specifying a single weighted depth value for at least two pixels of the rendered frame, wherein, to generate the plurality of depth values, the one or more processors are configured to generate, for each partition of the plurality of partitions, a respective depth value of the plurality of depth values; and send, to the wearable display device, the image content information for the rendered frame and the plurality of depth values, wherein the wearable display device is configured to modify one or more pixel values of the rendered frame using the plurality of depth values and the user's field of view at a second time to generate a warped rendered frame, wherein, to modify the one or more pixel values, the wearable display device is configured to map the rendered frame to points on a grid that causes the rendered frame to resize one or more objects of the rendered frame to correct for a camera translation of the user's field of view from the first time to the second time, wherein the camera translation represents a movement of the user's field of view closer or further from the one or more objects of the rendered frame.

21. The host device of claim 20, wherein, to generate the plurality of depth values, the one or more processors are configured to generate quantized depth data for each partition of the histogram of depth values for the plurality of pixels of the rendered frame.

22. The host device of claim 21, wherein, to generate the quantized depth data, the one or more processors are configured to divide the histogram into a pre-determined quantity of partitions.

23. The host device of claim 21, wherein, to generate the plurality of depth values, the one or more processors are configured to generate mask data, the mask data indicating two or more pixels of the rendered frame arranged in each partition of the histogram and wherein, to send the image content information, the one or more processors are configured to send the mask data to the wearable display device.

24. The host device of claim 21, wherein, to generate the plurality of depth values, the one or more processors are configured to generate, for each partition of the histogram, an indication of a macroblock assigned to a respective partition and wherein, to send the image content information, the one or more processors are configured to send an indication of the macroblock to the wearable display device.

25. The host device of claim 21, wherein, to generate the plurality of depth values, the one or more processors are configured to generate, for each partition of the histogram, a weighted depth value corresponding to a weighted average depth of pixels arranged in a respective partition, a minimum depth of pixels arranged in a respective partition, or a maximum depth of pixels arranged in a respective partition.

26. The host device of claim 20, wherein the plurality of pixels of the rendered frame comprises a first set of pixels and a second set of pixels and wherein, to generate the plurality of depth values, the one or more processors are configured to:

apply a first weighting factor to a depth value for the first set of pixels to generate a first weighted depth value; and apply a second weighting factor to a depth value for the second set of pixels to generate a second weighted depth value, wherein the second weighting factor has a different value than the first weighting factor.

\* \* \* \* \*